US012518659B2

(12) United States Patent
Vlad-Cluve et al.

(10) Patent No.: US 12,518,659 B2
(45) Date of Patent: Jan. 6, 2026

(54) ELECTROMECHANICAL DISPLAY DEVICES AND ARTIFICIAL INTELLIGENCE (AI) / MACHINE LEARNING (ML)-ENABLED CHATBOTS

(71) Applicant: Tokinomo Marketing SA, Bucharest (RO)

(72) Inventors: Mircea-Ioan Vlad-Cluve, Bucharest (RO); Bogdan Vitec, Bucharest (RO); Guilhem Christian Moulin, Montpelier (FR)

(73) Assignee: Tokinomo Marketing SA, Bucharest (RO)

( * ) Notice: Subject to any disclaimer, the term of this patent is extended or adjusted under 35 U.S.C. 154(b) by 338 days.

(21) Appl. No.: 18/173,253

(22) Filed: Feb. 23, 2023

(65) Prior Publication Data

US 2024/0290229 A1 Aug. 29, 2024

(51) Int. Cl.

*G09F 11/02* (2006.01)
*G06K 19/06* (2006.01)
*G09F 27/00* (2006.01)

(52) U.S. Cl.

CPC ...... *G09F 11/025* (2013.01); *G06K 19/06037* (2013.01); *G09F 27/005* (2013.01)

(58) Field of Classification Search

CPC ........ G09F 11/025; G09F 27/005; G09F 7/18; G09F 7/20; G09F 27/00; G09F 2027/001
See application file for complete search history.

(56) References Cited

U.S. PATENT DOCUMENTS

| | | | | |
|---|---|---|---|---|
| 531,577 A | | 12/1894 | Strawbridge et al. | |
| 5,003,716 A | * | 4/1991 | Dyar | G09F 11/025 40/503 |
| 5,255,463 A | * | 10/1993 | Werner | G09F 11/025 40/503 |

(Continued)

FOREIGN PATENT DOCUMENTS

| | | | |
|---|---|---|---|
| CA | 2509335 | A1 | 12/2006 |
| KR | 101894207 | B1 | 9/2018 |

(Continued)

OTHER PUBLICATIONS

International Search Report and Written Opinion, issued Aug. 13, 2024, PCT Application No. PCT/RO2024/000004.

(Continued)

*Primary Examiner* — Gary C Hoge
(74) *Attorney, Agent, or Firm* — LeonardPatel PC; Michael A. Leonard, II; Sheetal S. Patel

(57) ABSTRACT

Electromechanical display devices and chatbots that employ one or more artificial intelligence (AI)/machine learning (ML) models are disclosed. The electromechanical display device is configured to be attached to a shelf, glass surface of a refrigerator or window, or other product storage/display and includes one or more rotating prisms that have messages on their faces. The electromechanical display devices are activated when a customer approaches. A quick response (QR) code or barcode is displayed on the electromechanical display device that, when scanned by a user's smart phone or other mobile computing system, causes an application to launch on the user's computing system that provides chatbot functionality.

19 Claims, 19 Drawing Sheets

(56) References Cited

U.S. PATENT DOCUMENTS

| | | | | |
|---|---|---|---|---|
| 6,034,609 | A * | 3/2000 | Comiskey, Jr. | G09F 11/025 40/503 |
| 10,847,067 | B2 | 11/2020 | Oh et al. | |
| 2002/0007575 | A1* | 1/2002 | Barcha | G09F 11/025 40/624 |
| 2012/0198739 | A1 | 8/2012 | Venetucci et al. | |
| 2015/0154895 | A1* | 6/2015 | Cassidy | G09F 3/204 40/606.01 |
| 2017/0311736 | A1* | 11/2017 | Zheng | G09F 27/00 |
| 2018/0336596 | A1* | 11/2018 | Wang | H04L 12/12 |
| 2022/0180716 | A1* | 6/2022 | Conlon | G09F 9/30 |
| 2022/0304482 | A1* | 9/2022 | Otero Zambrana | G09F 7/18 |

FOREIGN PATENT DOCUMENTS

| | | | |
|---|---|---|---|
| RO | 130804 | B1 | 6/2020 |
| RO | 133684 | A3 | 8/2020 |
| WO | 2020159393 | A1 | 8/2020 |

OTHER PUBLICATIONS

Daniel A Hess, "Non-Final Office Action", issued Dec. 13, 2024, U.S. Appl. No. 18/453,527.

* cited by examiner

ELECTROMECHANICAL DISPLAY DEVICES AND ARTIFICIAL INTELLIGENCE (AI) / MACHINE LEARNING (ML)-ENABLED CHATBOTS

FIELD

The present invention generally relates to electronics and artificial intelligence, and more specifically, to electromechanical display devices and/or associated chatbots that employ one or more artificial intelligence (AI)/machine learning (ML) models.

BACKGROUND

Various product displays, such as cardboard displays, are currently available. Cardboard displays are static, and while relatively inexpensive, do not capture attention as well as moving, visually changing, and or sound-generating mechanisms. Since they are static, cardboard displays are also limited in the amount of information that they can convey to a potential customer. Also, even when a printed quick response (QR) code or barcode is included, support of an integrated communication platform on the backend is not provided.

Digital screen displays (e.g., tablets, television screens, computer monitors, etc.) can display dynamic messages, but they lack mechanical movement, which does not capture attention as well as moving mechanisms. Also, digital screen displays have become so ubiquitous that they are frequently ignored. Furthermore, digital screen displays draw significant amounts of electrical power, and thus need to be frequently recharged or plugged into an external continuous power supply.

Digital electronic paper (e-paper) displays, also sometimes called electronic ink (e-ink) or electrophoretic displays, mimic the appearance of ordinary ink on paper. However, these displays have a low luminosity/brightness and have a limited color palette. Thus, they have a lower impact visual effect. Furthermore, digital e-paper displays have a relatively high manufacturing cost, making them cost-prohibitive for many applications.

Rotating prism displays exist that are used in indoor/outdoor large print advertising. However, conventional rotating prism displays have various disadvantages. For instance, existing displays are not suitable for advertising on store shelves due to their large dimensions and lack of a suitable attachment mechanism. Also, mechanical system cannot be used for such a purpose by simply modifying the size of the display and its components. Furthermore, rotating prism displays are usually plugged into a constant power supply and, due to their relatively high power consumption, cannot be powered by off-the-shelf batteries.

Accordingly, an improved and/or alternative approach to display devices may be beneficial.

SUMMARY

Certain embodiments of the present invention may provide solutions to the problems and needs in the art that have not yet been fully identified, appreciated, or solved by current display technologies, and/or provide a useful alternative thereto. For example, some embodiments of the present invention pertain to electromechanical display devices and/or chatbots that employ one or more AI/ML models.

In an embodiment, an electromechanical display device includes a mounting mechanism and an adjustable arm operably connected to the mounting mechanism. The electromechanical display device also includes a display portion operably connected to the adjustable arm. The display portion includes a plurality of rotating prisms. Each rotating prism includes a plurality of faces. The display portion also includes a motor configured to cause the plurality of rotating prisms to rotate and a motion sensor configured to detect motion proximate to the electromechanical display device. The display portion further includes a microprocessor operably connected to the motor and the motion sensor. Responsive to the motion sensor detecting motion proximate to the electromechanical display device, the microcontroller is configured to cause the electromechanical display device to periodically rotate the plurality of rotating prisms.

In another embodiment, an electromechanical display device includes a plurality of rotating prisms. Each rotating prism includes a plurality of faces. The electromechanical display device also includes a motor configured to cause the plurality of rotating prisms to rotate and a motion sensor configured to detect motion proximate to the electromechanical display device. The electromechanical display device further includes a microprocessor operably connected to the motor and the motion sensor. Additionally, the electromechanical display device includes a clutch operably connected to a rotating prism of the plurality of rotating prisms and a printed circuit board (PCB) including a switch configured to be pressed by the clutch. Responsive to the motion sensor detecting motion proximate to the electromechanical display device, the microcontroller is configured to cause the electromechanical display device to periodically rotate the plurality of rotating prisms. The microprocessor is configured to detect that the switch was pressed by the clutch, via the PCB, and to stop rotation of the plurality of rotating prisms when the pressing of the switch is detected.

In yet another embodiment, an electromechanical display device includes a plurality of rotating prisms. Each rotating prism includes a plurality of faces. The electromechanical display device also includes a motor configured to cause the plurality of rotating prisms to rotate and a motion sensor configured to detect motion proximate to the electromechanical display device. The electromechanical display device further includes a microprocessor operably connected to the motor and the motion sensor. The microprocessor is configured to operate the electromechanical display device in a passive mode by default that has lower power consumption than an active mode where the plurality of rotating prisms are rotated. The microprocessor is configured to transition the electromechanical display device to the active mode responsive to the motion sensor detecting the motion proximate to the electromechanical display device. The microprocessor is configured to return the electromechanical display device to the passive mode after the motion sensor does not detect motion for a period of time.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
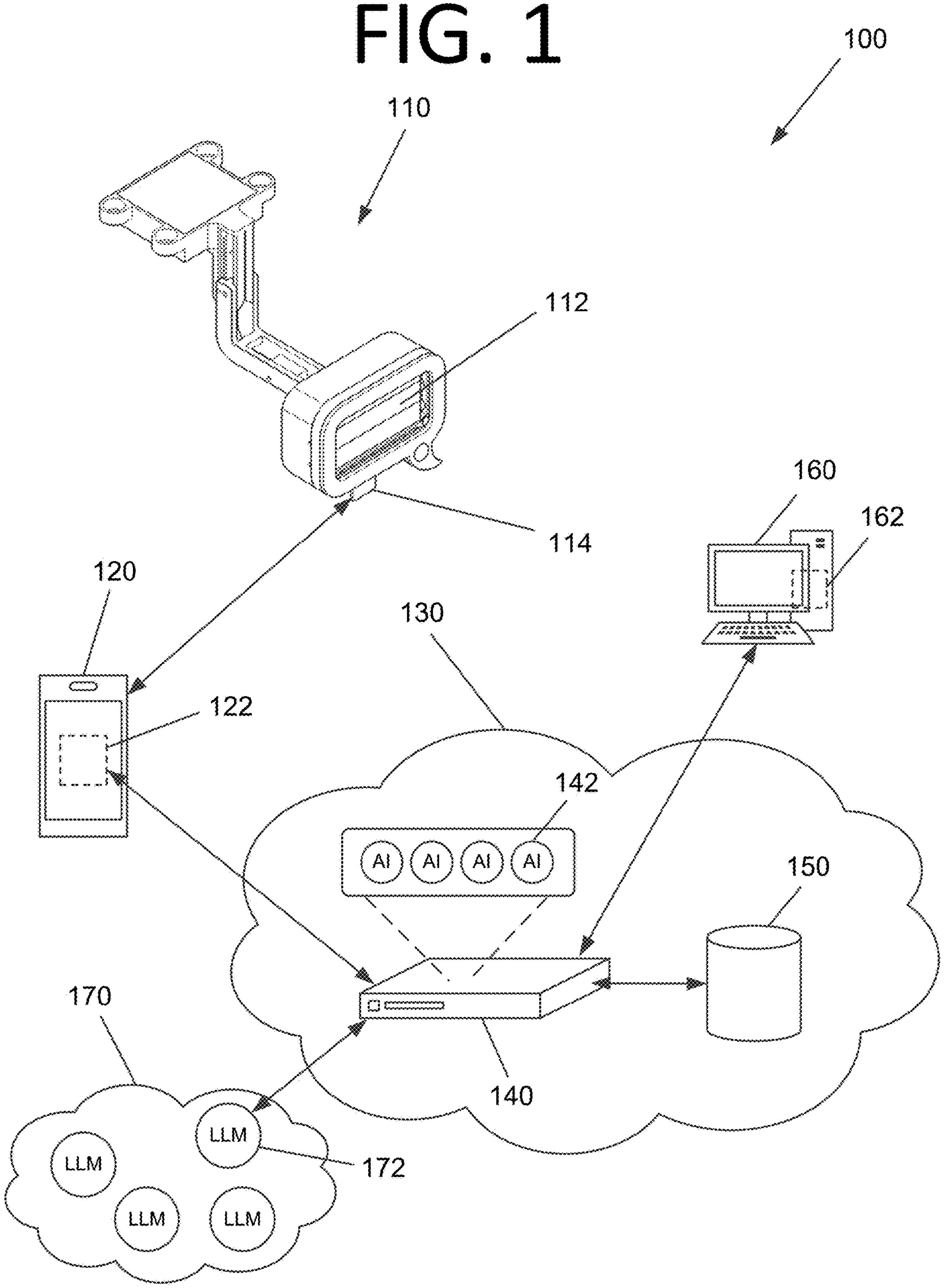
FIG. 1 is an architectural diagram illustrating a system configured to provide marketing messages for a product and to answer potential customer inquiries pertaining to the product, according to an embodiment of the present invention.
Figure 2A:
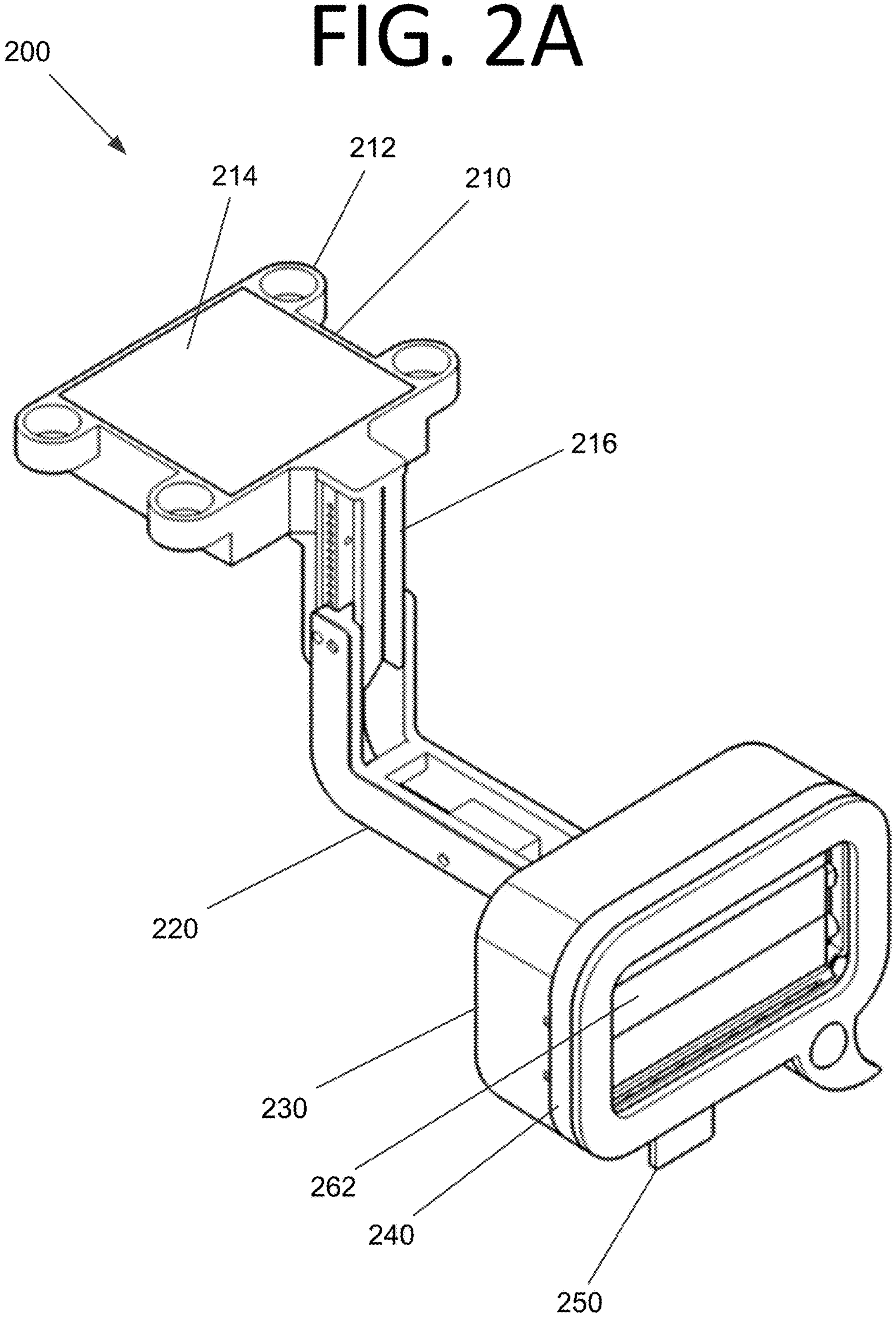
FIG. 2A is a front perspective view illustrating an electromechanical display device, according to an embodiment of the present invention.
Figure 2B:
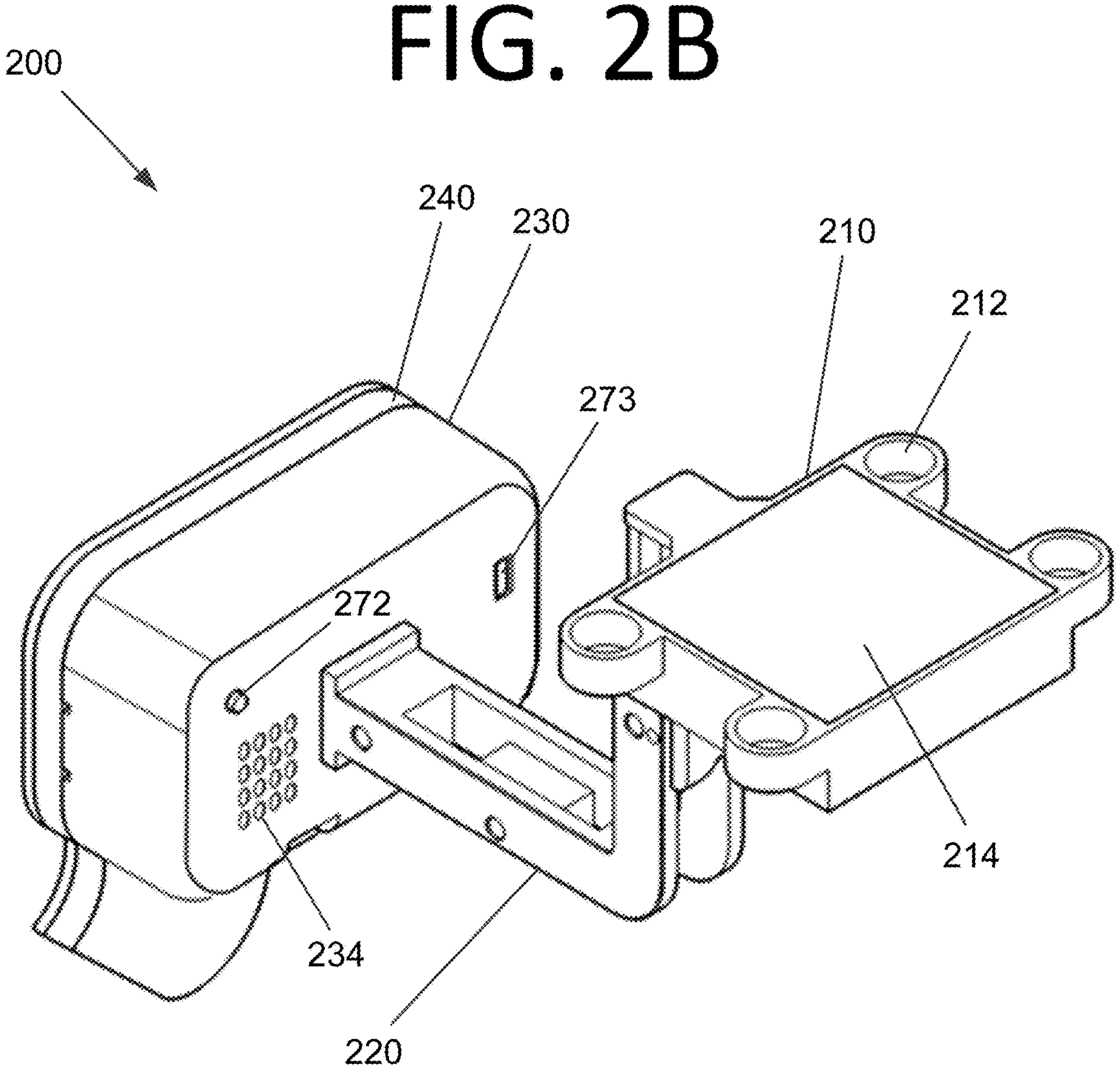
FIG. 2B is a rear perspective view illustrating the electromechanical display device, according to an embodiment of the present invention.
Figure 2C:
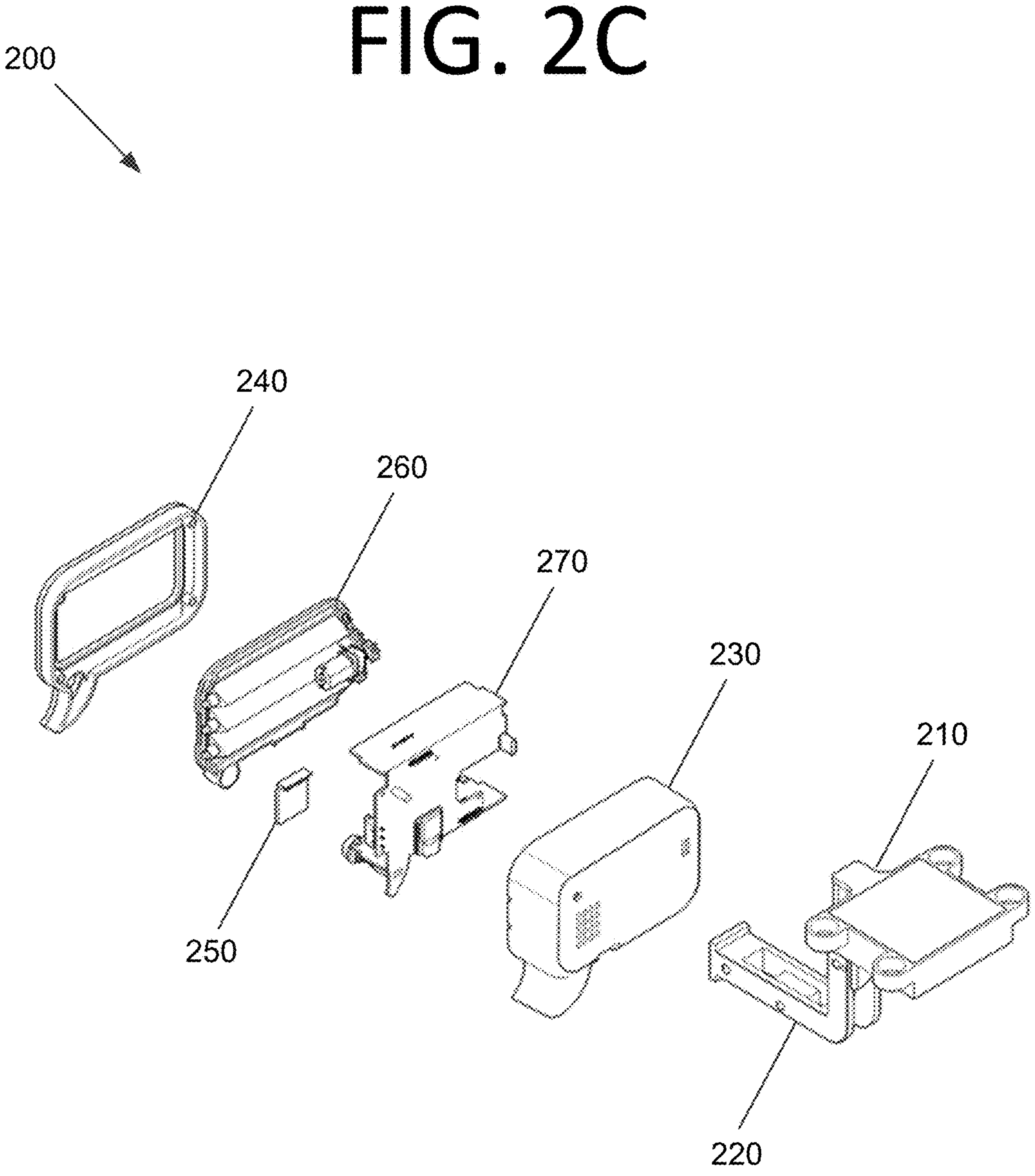
FIG. 2C is a rear exploded view illustrating the electromechanical display device, according to an embodiment of the present invention.
Figure 2D:
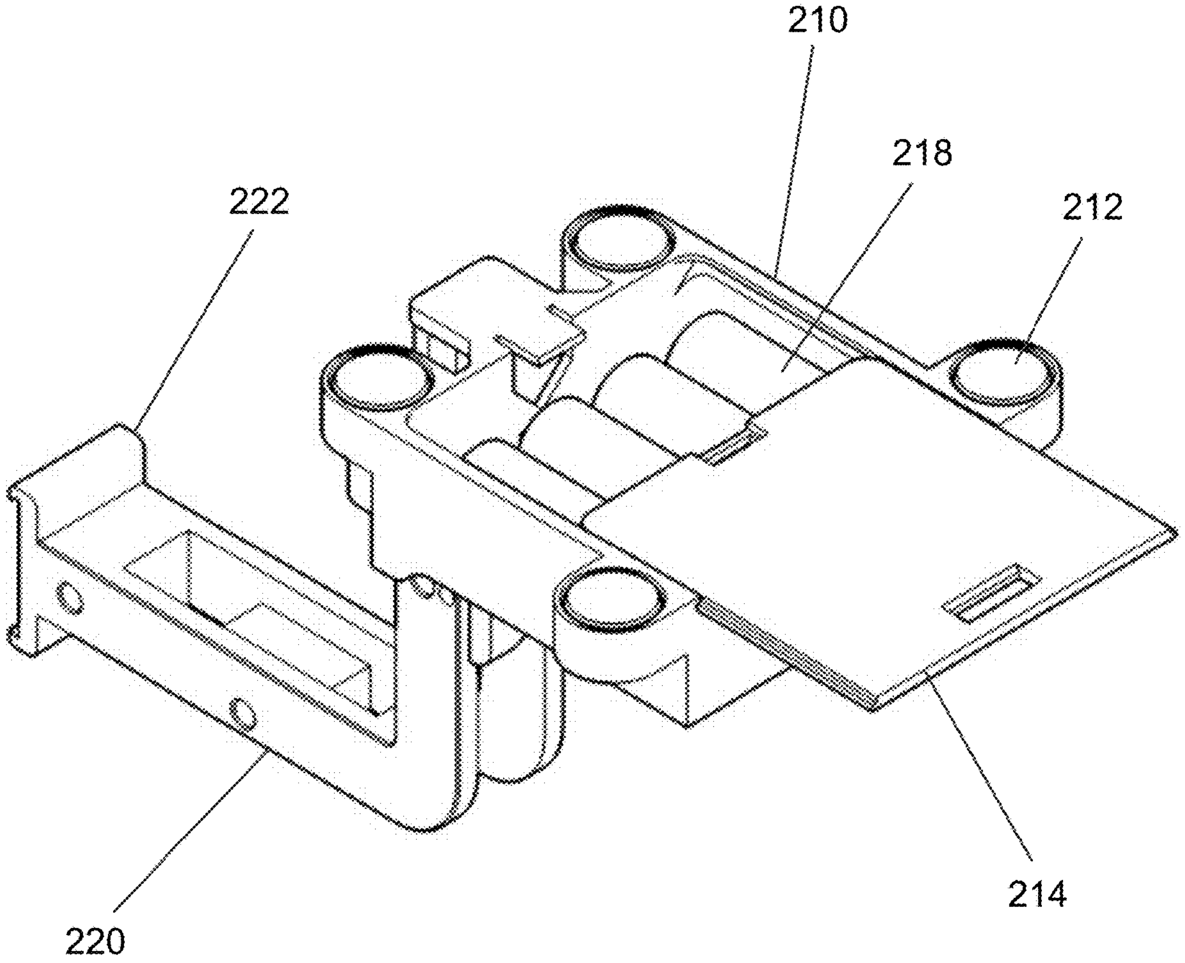
FIG. 2D is a perspective view illustrating a mounting mechanism and an adjustable arm of the electromechanical display device, according to an embodiment of the present invention.
Figure 2E:
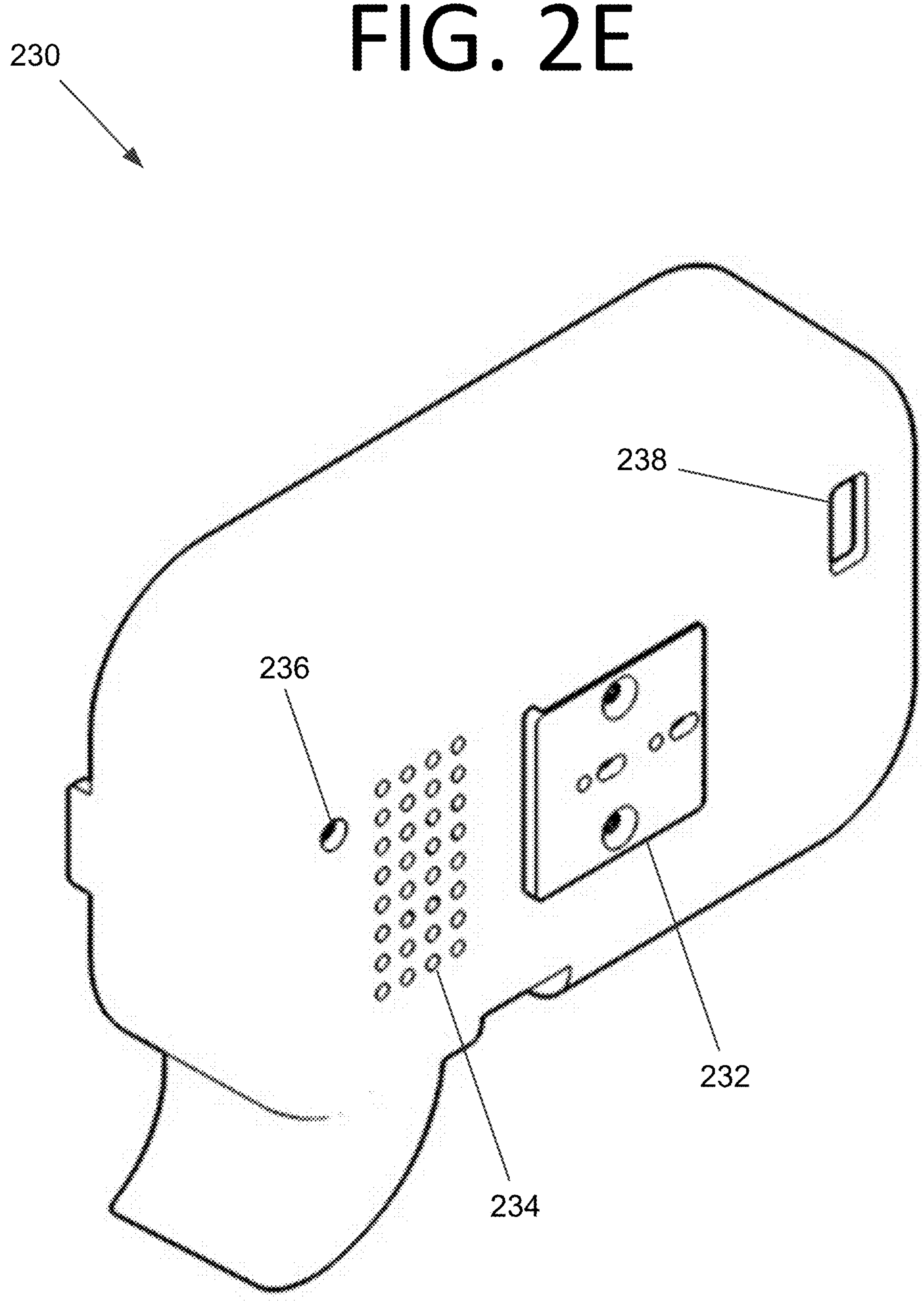
FIG. 2E is a perspective view illustrating a housing of the electromechanical display device, according to an embodiment of the present invention.
Figure 2F:
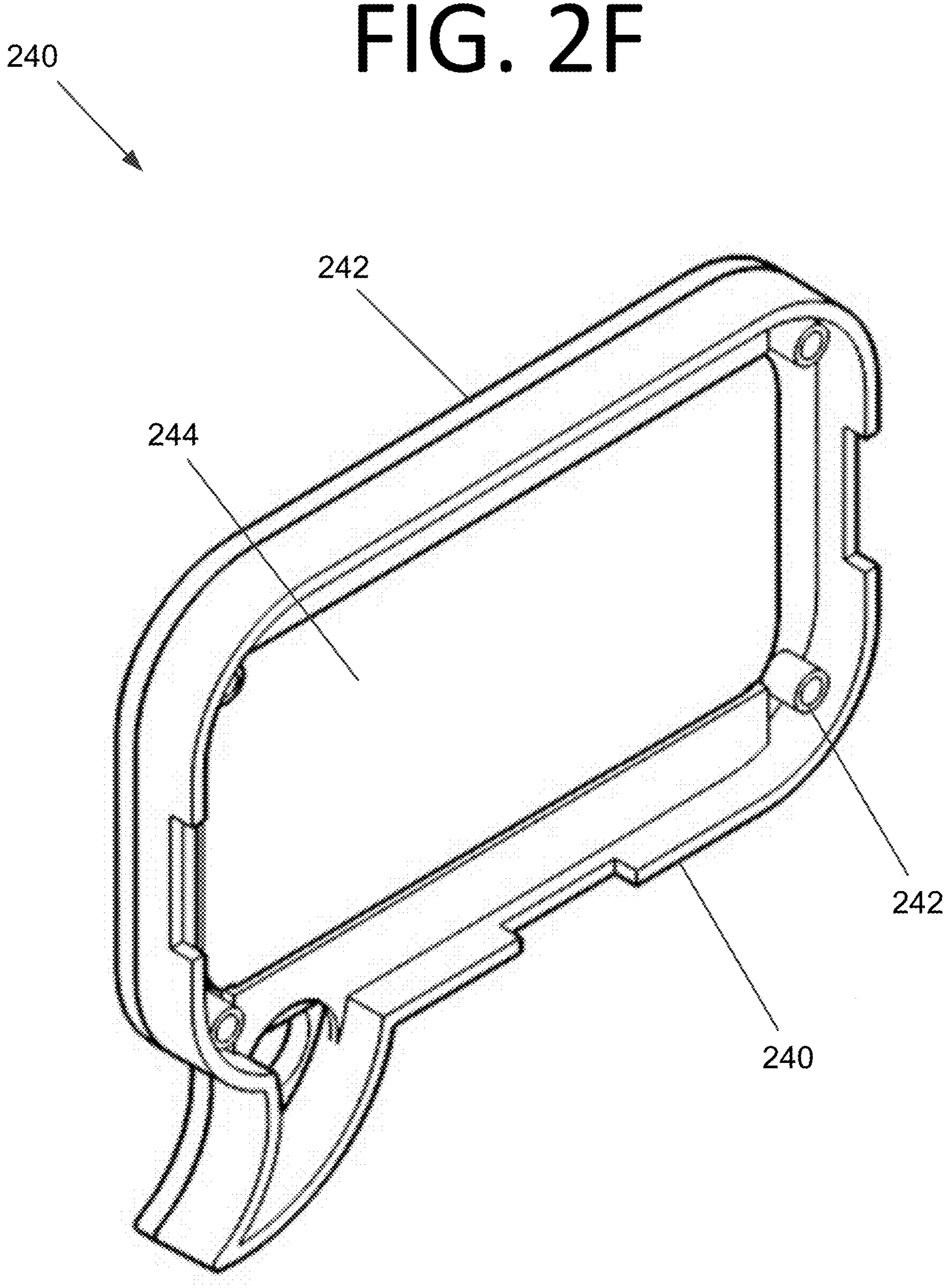
FIG. 2F is a perspective view illustrating a sandwich frame of the electromechanical display device, according to an embodiment of the present invention.
Figure 2G:
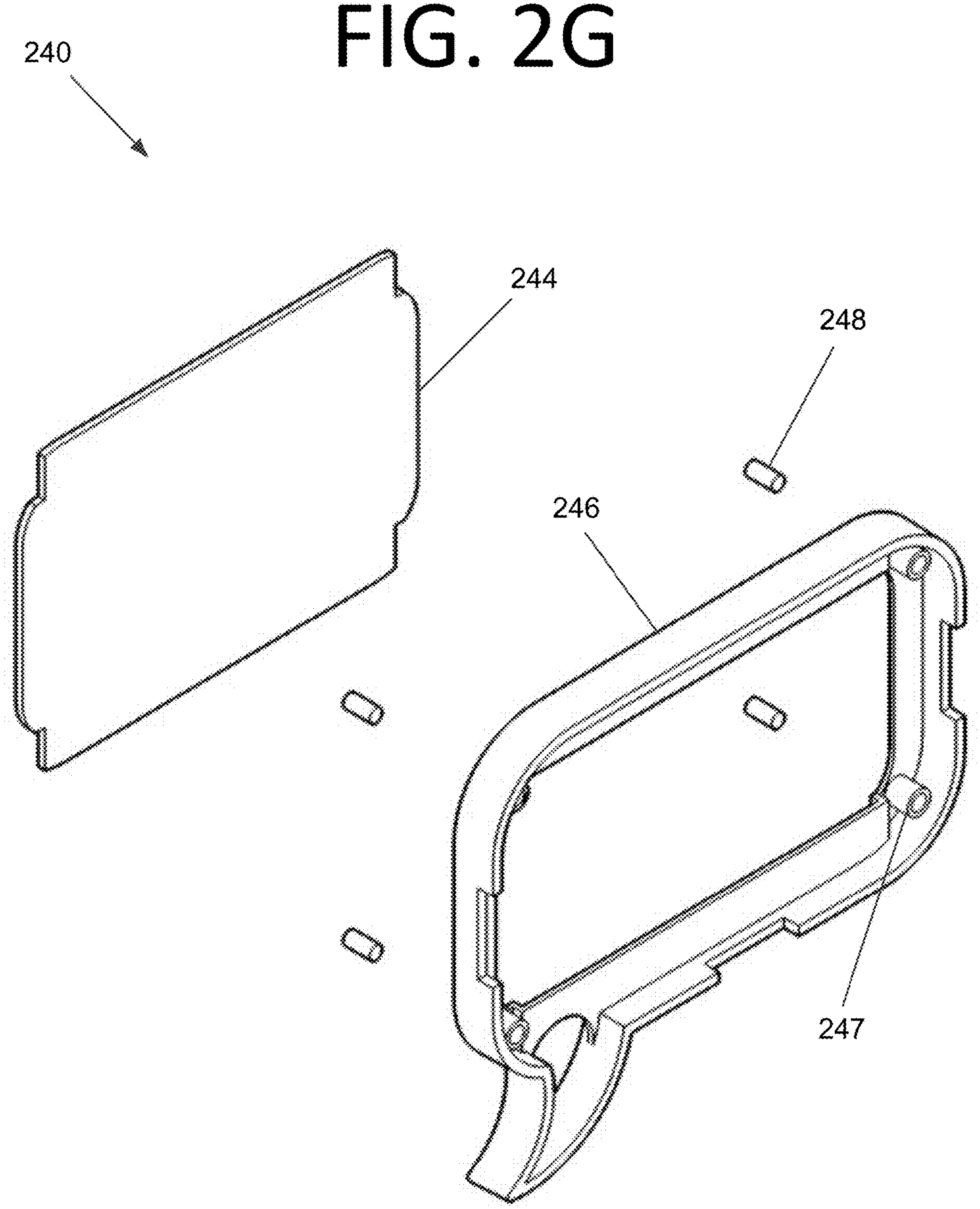
FIG. 2G is an exploded perspective view illustrating a frame and a screen of the sandwich frame, according to an embodiment of the present invention.
Figure 2H:
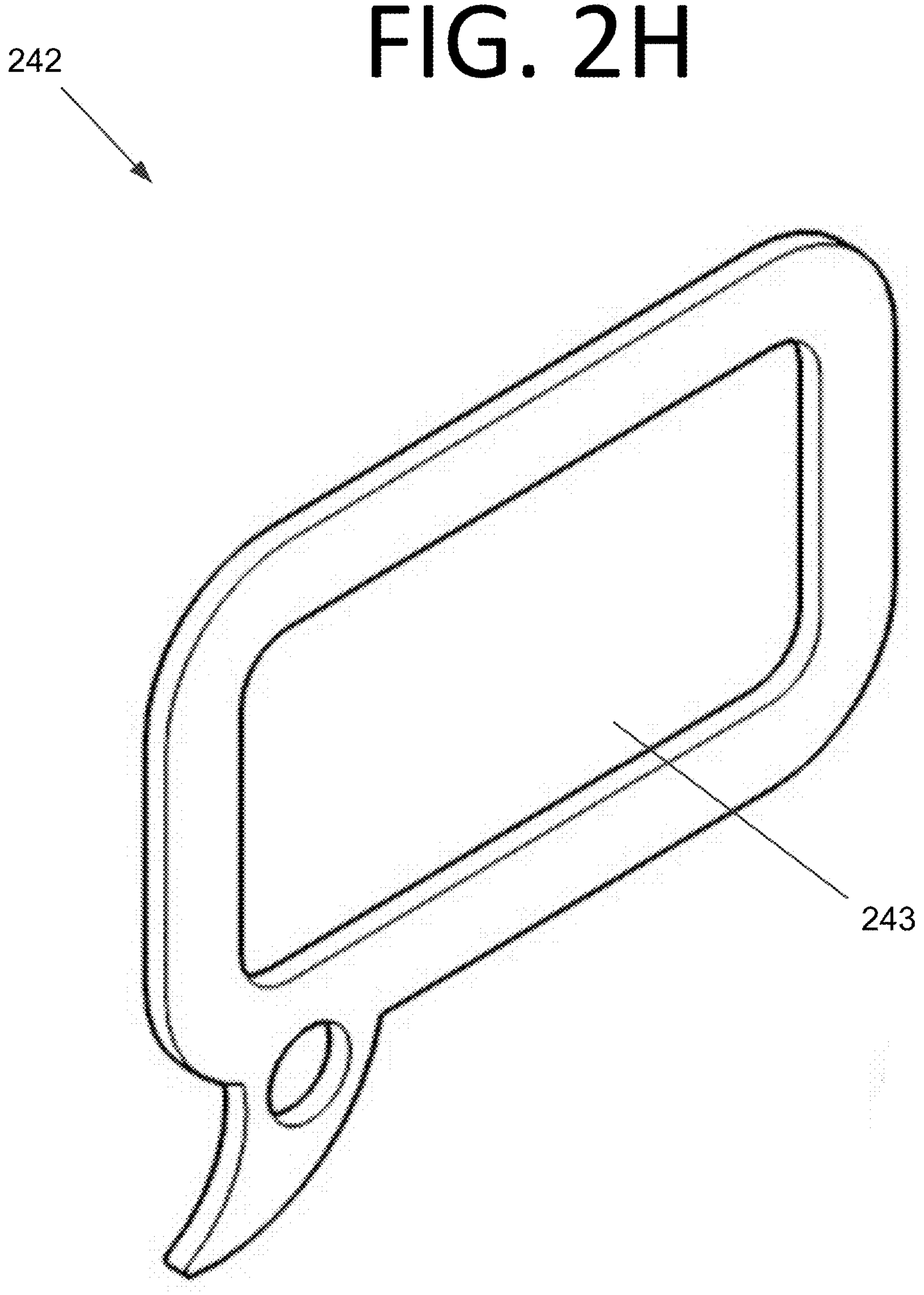
FIG. 2H is a perspective view illustrating a screen frame of the sandwich frame, according to an embodiment of the present invention.
Figure 2I:
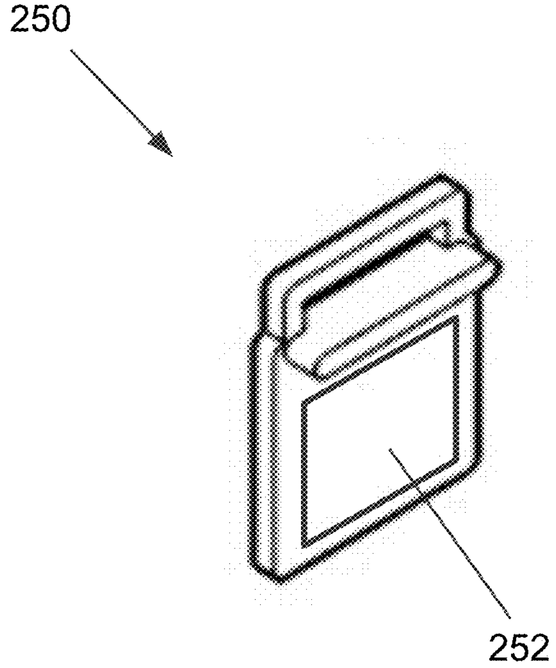
FIG. 2I is a perspective view illustrating a panel of the electromechanical display device, according to an embodiment of the present invention.
Figure 2J:
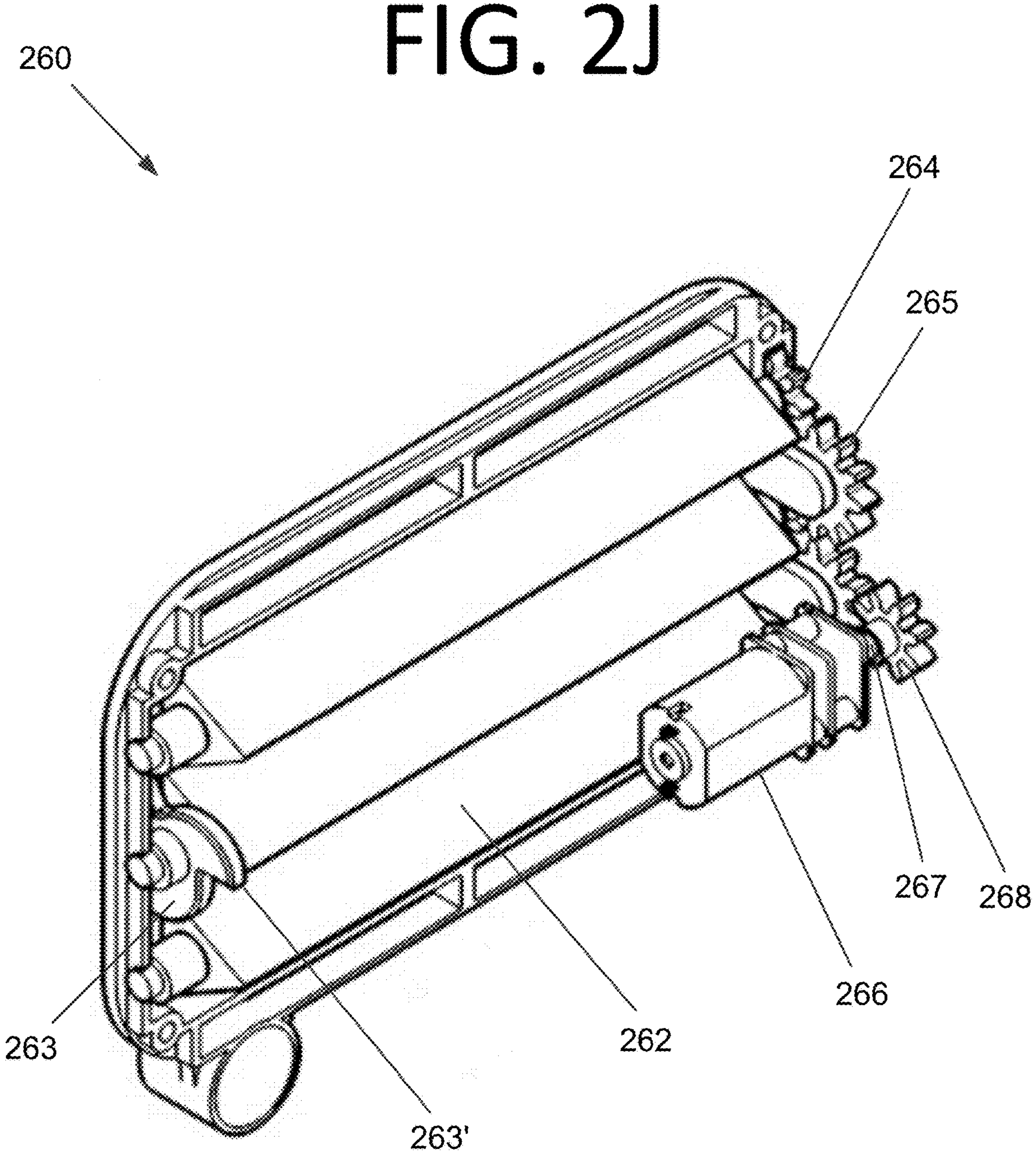
FIG. 2J is a perspective view illustrating a prism frame of the electromechanical display device, according to an embodiment of the present invention.
Figure 2K:
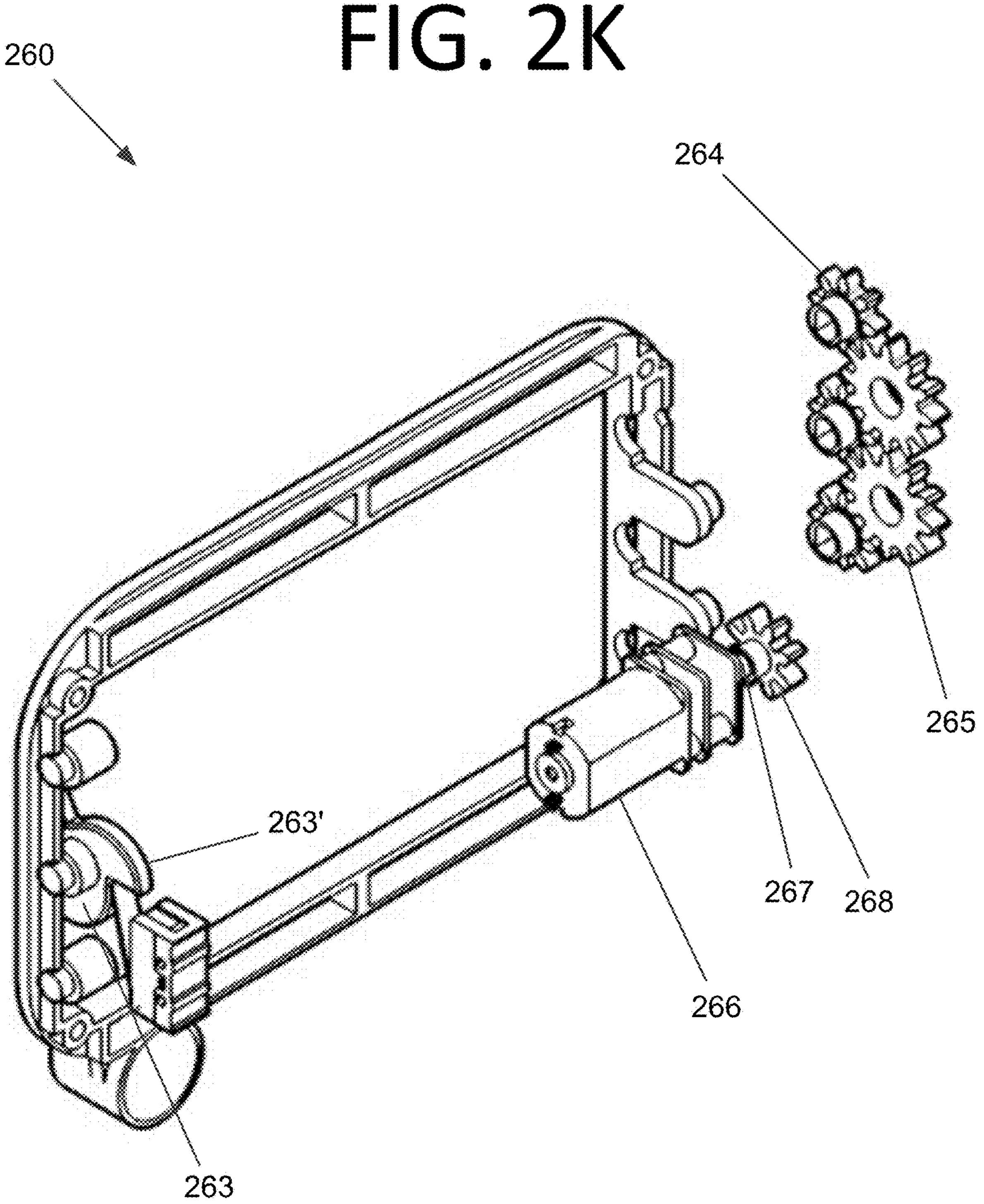
FIG. 2K is a partially exploded perspective view illustrating the prism frame, according to an embodiment of the present invention.
Figure 2L:
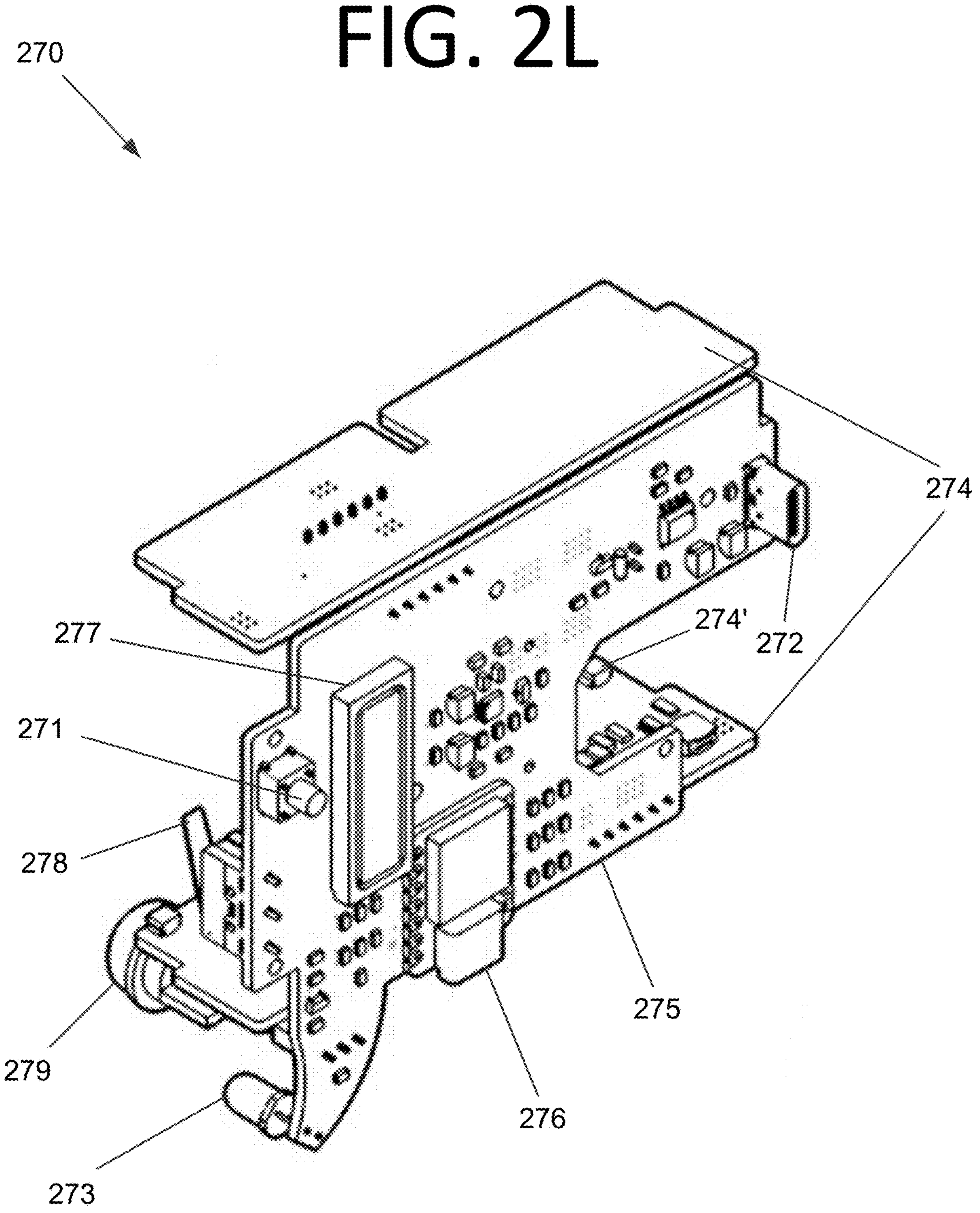
FIG. 2L is a perspective view illustrating electronics of the electromechanical display device, according to an embodiment of the present invention.

Some embodiments pertain to electromechanical display devices and/or chatbots that employ one or more AI/ML models. The electromechanical display device of some embodiments is configured to be attached to a shelf, glass surface of a refrigerator or window, or other product storage/display and includes one or more rotating prisms that have messages on their faces. The electromechanical display device has a speech bubble shape in some embodiments to provide interactive messaging and encourage consumers to interact therewith. The electromechanical display devices of some embodiments may be used for product marketing in supermarkets, drug stores, gas stations, home improvement stores, sporting event vendor stands, or for any other suitable purpose and/or location without deviating from the scope of the invention. Such embodiments solve the technical problem of providing a compact, flexible display technology that is highly effective at attracting the attention of potential customers and/or facilitates on-site, product-focused, AI-driven chatbot functionality.

The electromechanical display device may include a motion sensor that enables the electromechanical display device to detect when a potential customer approaches the device. The electromechanical display device may operate in a "passive mode" when no potential customer is detected, periodically checking whether an object is detected proximate thereto. When a potential customer is detected, the electromechanical display device may switch to an active mode that consumes more power. When in active mode, the electromechanical display device may periodically rotate the rotating prism(s) to expose the different faces thereof, emit noises and/or audio messages, flash and/or turn on lights, etc. The rotating prisms may have any desired number of faces without deviating from the scope of the invention. However, if the rotating prisms have a triangular or square profile, messages of other faces may be hidden.

In some embodiments, a printed or electronic QR code or barcode is displayed on the electromechanical display device. When scanned by a user's smart phone or other mobile computing system, the QR code or barcode causes an application to launch on the user's mobile computing system. Supported application(s) may be those commonly available on user's mobile computing systems in some embodiments, such as WhatsApp®, Facebook® Messenger, Telegram®, Viber®, WeChat®, etc. In certain embodiments, scanning the QR code or barcode causes the user's mobile computing system to prompt the user to access a custom web application or mobile website that is specifically designed for the product or service being offered. This may provide a more streamlined and intuitive user experience without the need to download an application, as well as provide the ability to gather more data and insights into user behavior and preferences. In some embodiments, scanning the QR code or barcode may prompt the user's mobile computing system to present the user with an interface to download a custom application if the user does not already have it installed, such as the Apple® App Store via iOS®. The application includes or operably communicates with an intelligent chatbot that is configured to answer the user's questions above the associated product via the launched application.

By using active/passive modes and efficient electronics, the electromechanical display device may be able to operate for a long period of time before batteries need to be recharged or changed. For instance, in some embodiments, the electromechanical display device may last for the entire duration of a typical promotion campaign (e.g., two weeks to one month). The electromechanical display device may use disposable batteries (e.g., AA, AAA, etc.) or may include its own rechargeable battery (e.g., a lithium-ion battery). In certain embodiments, the electromechanical display device may have an alternating current (AC) power supply in addition to or in lieu of batteries, which would allow the device to operate indefinitely.

FIG. 1 is an architectural diagram illustrating a system 100 configured to provide marketing messages for a product and to answer potential customer inquiries pertaining to the product, according to an embodiment of the present invention. An electromechanical display device 110 provides marketing messages to potential customers via a rotating prismatic display 112. In some embodiments, electromechanical display device 110 may be electromechanical display device 200 of FIGS. 2A-L. Electromechanical display device 110 also includes a QR code or barcode 114 (static or digital) that can be scanned by the potential customer via a mobile computing system (in this example, smart phone 120). Any suitable computing system (e.g., a laptop computer, a tablet, etc.) may be used without deviating from the scope of the invention.

When the potential customer scans QR code or barcode 114 via a camera (not shown) of smart phone 120, an application 122 associated with QR code or barcode 114 is launched. In some embodiments, if application 122 is not present on smart phone 120, QR code or barcode 114 causes smart phone 120 to open an application store and prompt the potential customer regarding whether to download the associated application. This may be accomplished using existing functionality in iOS® or Android®, for example.

Application 122 provides chatbot functionality that answers user inquiries regarding the product associated with QR code or barcode 114. In this embodiment, application 122 sends requests and receives responses over a network 130 (e.g., a local area network (LAN), a mobile communications network, a satellite communications network, the Internet, any combination thereof, etc.) to a cloud server 140. In some embodiments, cloud server 140 may be part of a public cloud architecture, a private cloud architecture, a hybrid cloud architecture, etc. In certain embodiments, cloud server 140 may host multiple software-based servers on a single computing system. Cloud server 140 includes natural language processing (NLP) AI/ML models 142 that have been trained to receive potential customer inquiries as input and to provide responses as output. For instance, if a user asks for nutrition information for a product, asks for a list of ingredients, asks if the product is safe for a person with a particular allergy, asks for advantages over competitor products, etc., AI/ML models 142 provide answers that simulate human responses.

In order to train AI/ML models 142, training data (labeled, unlabeled, or both) may be stored in a database 150 and provided by a training data application 162 of a training computing system 160 that can label training data. AI/ML models 142 may be initially trained using this training data, and as new training data is available over time, one or more of AI/ML models 142 may be replaced with newly trained AI/ML models or be retrained to increase accuracy. Retraining may be performed in response to detecting data and/or model drift in some embodiments.

In some embodiments, AI/ML models 142 hosted on cloud server 140 may include a Large Language Model (LLM) that may be fine-tuned to specific domains or industries in some embodiments. Responsive to the user scanning QR code or barcode 114, application 122 or the operating system of smart phone provides a customized prompt with information specific to the product promoted by electromechanical display device 110 to this LLM. For example, if electromechanical display device 110 is located in a grocery store, cloud server 140 may be configured to host an LLM AI/ML model that is trained to answer questions about food and nutrition. In certain embodiments, an LLM 172 provided by an existing cloud ML service provider, such as OpenAI®, Google®, Amazon®, Microsoft®, IBM®, Nvidia®, Facebook®, etc., may be employed and trained to provide the desired product information responsive to user inquiries.

In LLM embodiments where LLM 172 is remotely hosted, cloud server 140 can be configured to integrate with third-party LLM APIs, which allow cloud server 140 to send a custom prompt (e.g., providing the user's inquiry) to LLM 172 and receive a response in return (e.g., the answer to the inquiry). The custom prompt can also include information specific to the product or service being promoted by electromechanical display device 110, such as product features, benefits, and pricing. After this information is provided, the conversation can continue between the user and LLM 172 taking into account that the context that has been established. Such embodiments may provide a more advanced and sophisticated user experience, as well as provide access to state-of-the-art NLP and ML capabilities that these companies offer.

FIGS. 2A-L illustrate an electromechanical display device 200 and components thereof, according to an embodiment of the present invention. In some embodiments, electromechanical display device 200 is electromechanical display device 110 of FIG. 1. Electromechanical display device 200 includes a mounting mechanism 210 that enables electromechanical display device 200 to be mounted to a shelf, a window, a wall, etc. via attachment mechanisms 212. Attachment mechanisms 212 may be magnets, screws, clasps, suction cups, clamps, or any other suitable attachment mechanism for the object or surface to which electromechanical display device 200 is to be attached without deviating from the scope of the invention.

Mounting mechanism 210 includes a cover 214 that covers batteries 218 in this embodiment (see FIG. 2D) and an adjustable arm mount 216 configured to be attached to an adjustable arm 220. While batteries 218 are off-the-shelf batteries, such as AA, AAA, C, or D batteries in this embodiment, lithium-ion batteries or an AC power supply may be used as the power supply without deviating from the scope of the invention. In some embodiments, the power supply may be located elsewhere in electromechanical display device 200, such as inside housing 230. Adjustable arm 220 enables mounting mechanism 210 to be raised and lowered to position the display portion (230, 240, 250, 260, 270, 280) of electromechanical display device 200 as desired.

Adjustable arm 220 is attached to a housing 230 via corresponding attachment mechanisms 222, 232 of adjustable arm 220 and housing 230, respectively. In this embodiment, housing 230 is in the shape of a speech bubble, as is sandwich frame 240, to which housing 230 is attached. Housing 230 includes a grid of speaker holes 234, an opening 236 for a button 271 that controls operation of electromechanical display device 200, and an opening 238 for a universal serial bus (USB) port 272. Sandwich frame 240 (see FIGS. 2F-H) includes a screen frame 242 with an opening 243 for a screen 244 constructed from a transparent material (e.g., plexiglass, glass, clear plastic, etc.). Sandwich frame 240 also includes a structural frame 246 with an opening 247 for magnets 248. Magnets 248 are used in this embodiment to hold sandwich frame 240 to housing 230 in a manner that makes it easier for the operator to detach sandwich frame 240 while changing stickers (if used) with the messages for the faces of rotating prisms 262. However, any suitable attachment mechanism (e.g., screws, clasps, etc.) may be used without deviating from the scope of the invention.

A panel 250 (see FIG. 2I) displays a QR code or barcode. In some embodiments, panel 250 includes a digital screen 252 that allows the QR code or barcode to be controlled via electronics 270. Panel 250 is held in place between housing 230 and sandwich frame 240 in this embodiment. In some embodiments, multiple panels 250 may be used.

A prism frame 260 (see FIGS. 2J and 2K) houses multiple rotating prisms 262 (three in this embodiment). In some embodiments, messages on the faces of rotating prisms 262 may be digital and controlled by electronics 270. A clutch 263 is operably connected to one of rotating prisms 262 and switches a switch 278 of electronics 270 to indicate to electronics 270 that rotation of rotating prisms 262 to the next face is complete. Spur gears 264, 265 rotationally connect rotating prisms 262 with a drive gear 268 driven by a motor 266 via a drive shaft 267.

In some embodiments, the messages on faces of rotating prisms 262 (e.g., two prisms, three prisms, five prisms, etc.) are coordinated. For instance, the messages on the concurrently shown faces of rotating prisms 262 display ordered messages from top to bottom that are part of the same advertisement message. If there are three rotating prisms 262, as is the case in the embodiment of FIGS. 2A-L, the message of the top prism may be an introduction to the message for the middle prism, and the bottom prism may be a conclusion. For instance, for a food product such a Cheetos®, the top message could be "Are you Hungry?", the middle message could be "Try Cheetos® Flamin' Hot Tangy Chili Fusion!", and the bottom message could be "$1.00 Off for a Limited Time!".

In order to synchronize the associated faces of rotating prisms 262 and ensure that the respective collective advertisement message is shown, and shown in the correct order, clutch 263 has three slightly different teeth 263' in this embodiment that press and move switch 278 to a different extent. Alternatively, teeth 263' may be the same size, and a switch counter may be maintained by a microprocessor 276 of electronics 270 to track which faces/message are shown. Microprocessor 276 is configured to reset the counter after all corresponding sets of faces of rotating prisms 262 have been shown. By counting the amount of time that switch 278 is pressed each time, electronics 270 can determine which faces are currently showing since each tooth 263' presses switch 278 for a different amount of time and/or to a different extent due to the different shapes of teeth 263' in some embodiments.

Electronics 270 are operably connected to motor 266. Electronics 270 include a button 271 that causes electronics 270 to perform multiple functions in some embodiments, such as muting electromechanical display device 200, turning electromechanical display device 200 on and off, stopping rotation of rotating prisms 262 so messages on the faces thereof can be changed, etc. A USB port 272 connects electronics 270 to the power supply of mounting mechanism 210. A status light-emitting diode (LED) 273 may indicate various statuses with respect to electromechanical display device 200, such as whether electromechanical display device 200 is on (e.g., a solid glow), whether batteries 218 are running low (e.g., blinking), etc.

LED printed circuit boards (PCBs) 274 drive respective LEDs 274' thereon. A motherboard 275 includes microprocessor 276 that controls operations of electronics 270 and motor 266. Motherboard 275 also includes a speaker 277 to provide audio messages, sounds, etc., switch 278, and a motion sensor 279. When motion sensor 279 detects that a potential customer is near, microprocessor 276 causes electronics 270 to transition from a passive state to an active state by controlling LEDs 274', speaker 277, motor 266 (e.g., powering motor 266 until switch 278 is switched, etc.). After a period of time has passed without detecting movement, microprocessor 276 causes electronics 270 to transition back to passive mode.

Figure 3:
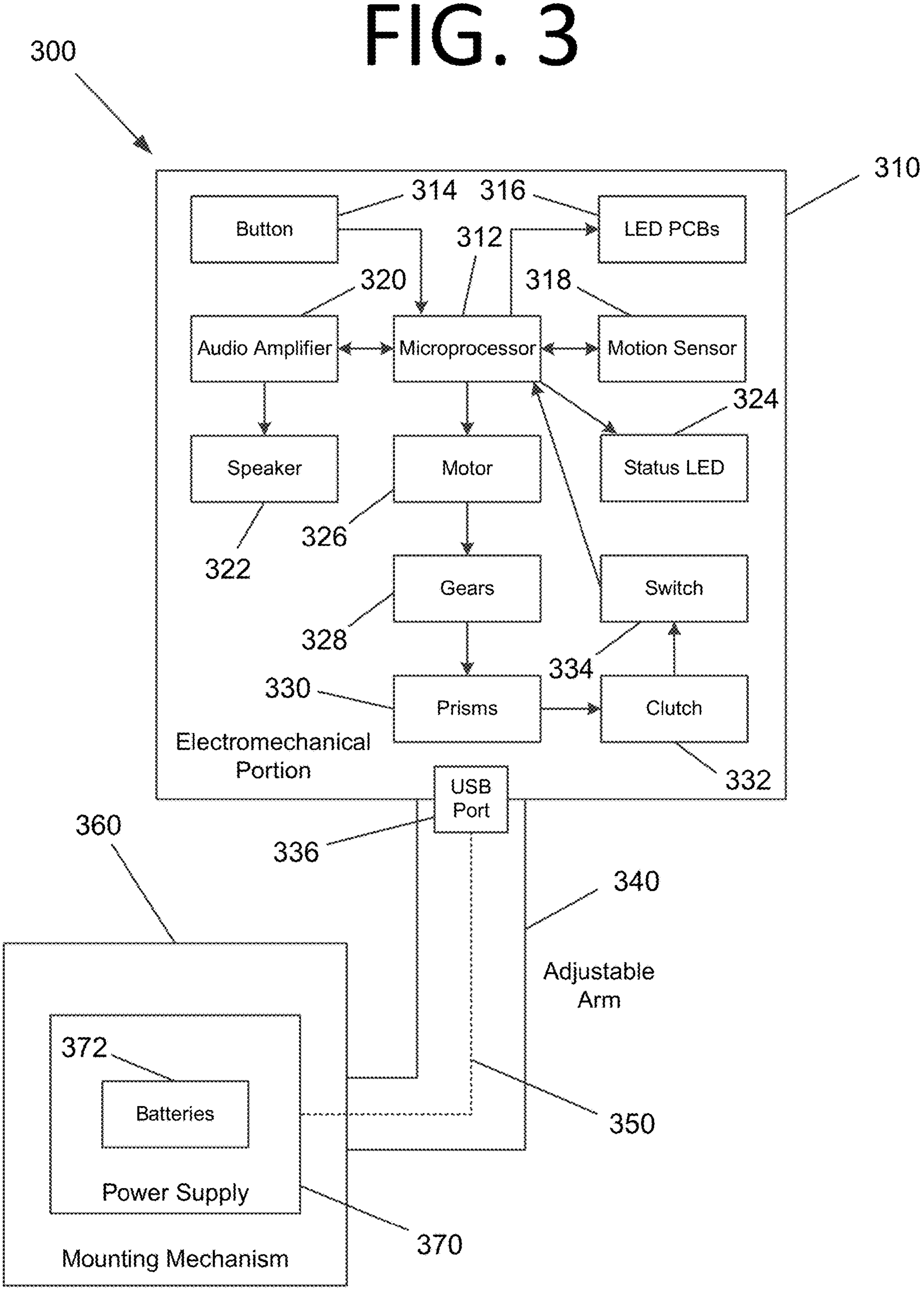
FIG. 3 is an architectural diagram illustrating components of an electromechanical display device, according to an embodiment of the present invention.

FIG. 3 is an architectural diagram illustrating components of an electromechanical display device 300, according to an embodiment of the present invention. In some embodiments, electromechanical display device 300 may be electromechanical display device 100 and/or electromechanical display device 200 of FIGS. 1 and/or 2. Electromechanical display device 300 includes an electromechanical portion 310, an adjustable arm 340, a mounting mechanism 360, and a power supply 370.

Electromechanical portion 310 includes a microcontroller 312 that controls the operation of the components of electromechanical portion 310. A button 314 allows a user to control the operation of electromechanical portion 310. Microprocessor 312 controls and/or interacts with LED PCBs 314, motion sensor 318, audio amplifier 320 (which amplifiers signals for speaker 322), and motor 326.

When microprocessor 312 activates motor 326, gears 328 of motor 326 and prisms 330 cause prisms 330 to rotate. A clutch 332 operably connected to a prism 330 engages a switch when prism 330 rotates. Microprocessor 312 receives a signal indicating that switch 334 has been moved and stops motor 326 accordingly. This allows microprocessor 312 to change the faces of prisms 330 that are visible.

A USB port 336 provides a USB connection to power supply 370 housed within mounting mechanism 360 via a USB cable 340 that runs along and/or through adjustable arm 340. Power supply 370 includes batteries 372 in this embodiment. However, any suitable power mechanism may be used without deviating from the scope of the invention.

Figure 4A:
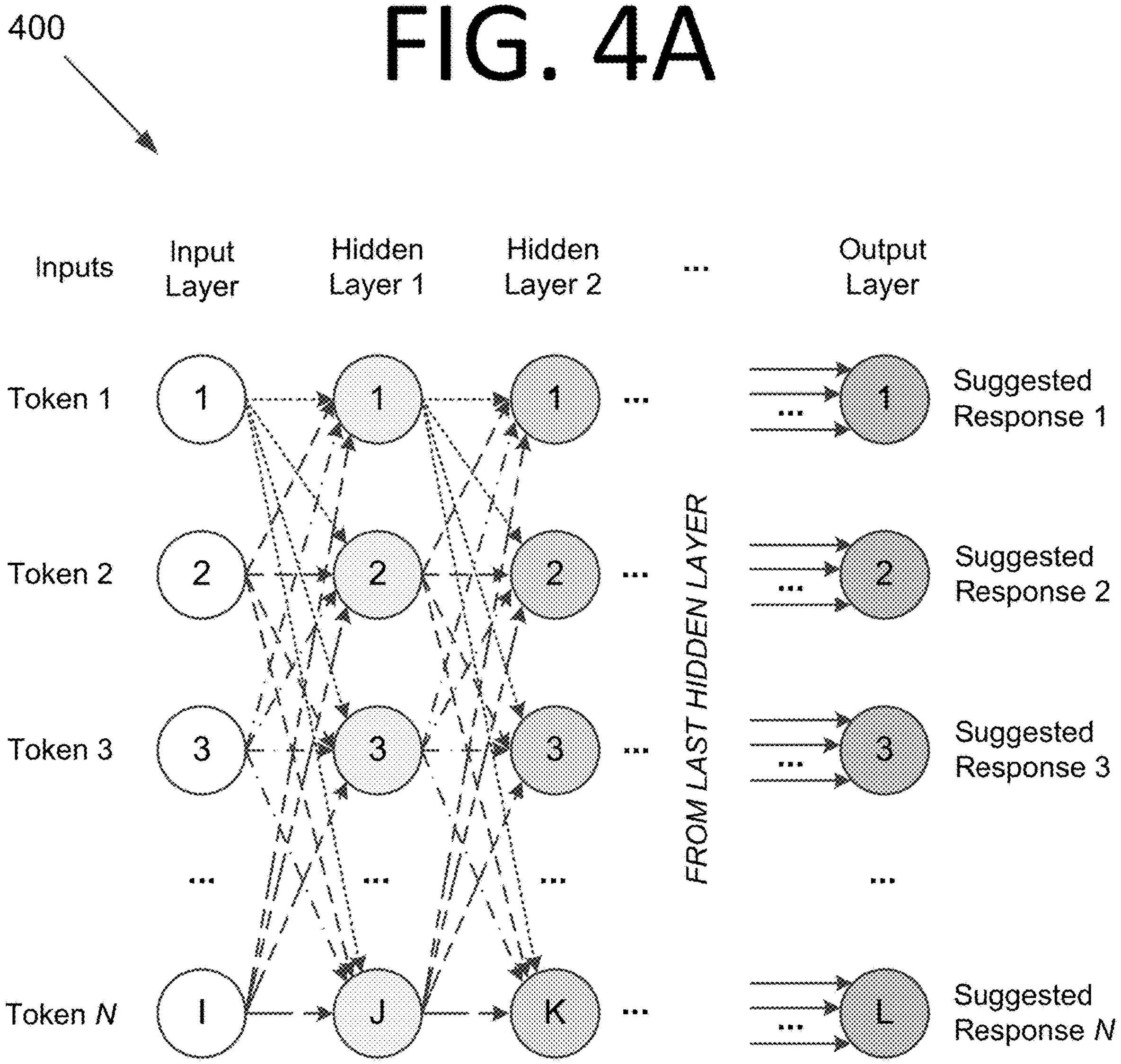
FIG. 4A illustrates an example of a neural network that has been trained to receive textual inquiries as input and produce suggested responses to the textual inquiries as output, according to an embodiment of the present invention.

Per the above, AI/machine learning (ML) may be used by an application in some embodiments to provide chatbot functionality. Various types of NLP AI/ML models may be trained and deployed without deviating from the scope of the invention. For instance, FIG. 4A illustrates an example of a neural network 400 that has been trained to receive textual inquiries as input and produce suggested responses to the textual inquiries as output, according to an embodiment of the present invention.

Neural network 400 includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 400.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 4A, textual inquiries are broken up into tokens (e.g., words, phrases, or both, that make up subsets of the textual inquiry string). These tokens are provided as the input layer and fed as inputs to the J neurons of hidden layer 1. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. While multiple suggestions are shown here as output, in some embodiments, only a single output suggestion is provided. In certain embodiments, the suggestions are ranked based on confidence scores.

It should be noted that numbers of neurons I, J, K, and L are not necessarily equal. Thus, any desired number of layers may be used for a given layer of neural network 400 without deviating from the scope of the invention. Indeed, in certain embodiments, the types of neurons in a given layer may not all be the same.

Neural network 400 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 4B:
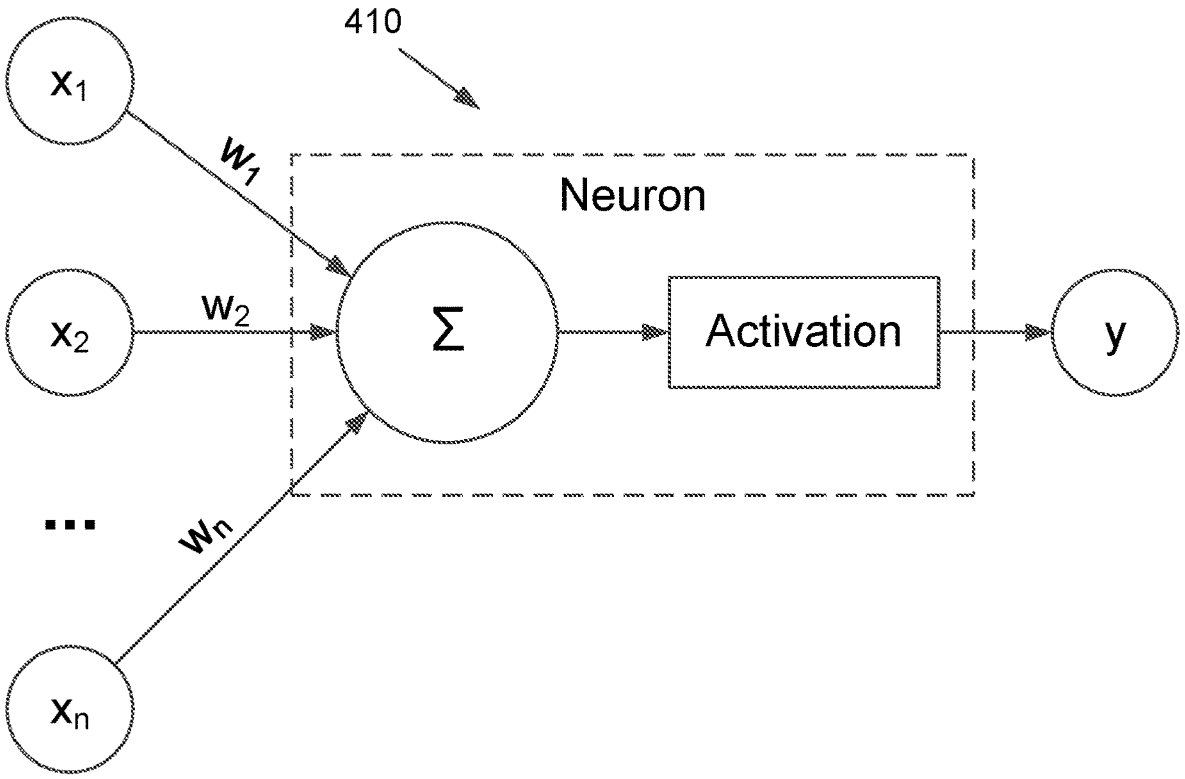
FIG. 4B illustrates an example of a neuron, according to an embodiment of the present invention.

An example of a neuron 410 is shown in FIG. 4B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_ix_i) + \text{bias} \quad (1)$$

This summation is compared against an activation function $f(x)$ to determine whether the neuron "fires". For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \quad (2)$$

The output y of neuron 410 may thus be given by:

$$y = f(x)\sum_{i=1}^{m}(w_ix_i) + \text{bias} \quad (3)$$

In this case, neuron 410 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 400. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \quad (4)$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f_j'(n_j)$, where $n_j$ is the network activity at layer j (i.e., $n_j=W_j o_{j-1}+b_j$) where $o_j=f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0=x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to a single model and/or to be applied based on the inquiry type. For example, one model may be trained to find potential allergies and another model may be trained to compare competitor products to the product of interest and list differences and/or advantages between the product of interest and those of competitors.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, Open AI, etc. may be used in some embodiments to facilitate semantic understanding and provide more accurate and human-like answers. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 5:
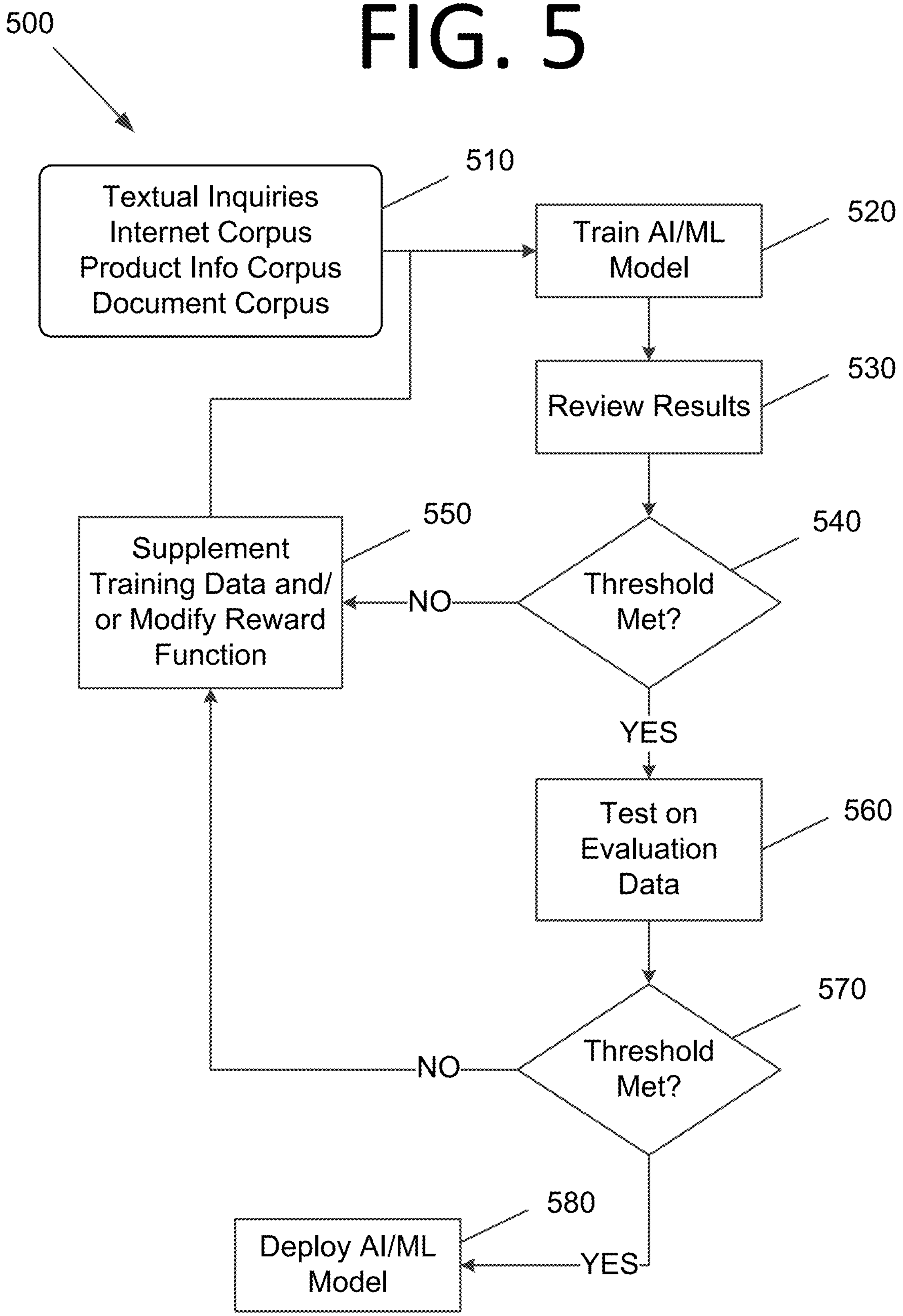
FIG. 5 is a flowchart illustrating a process for training AI/ML model(s), according to an embodiment of the present invention.

FIG. 5 is a flowchart illustrating a process 500 for training AI/ML model(s), according to an embodiment of the present invention. In some embodiments, the AI/ML model(s) may be LLM(s). LLMs are a type of neural network that has been trained on large amounts of text data to generate human-like language responses to text-based inputs. The goal of LLMs is to enable computing systems to understand and generate natural language. This has a wide range of applications, such as language translation, chatbots, and virtual assistants.

The neural network architecture of LLMs typically include multiple layers of neurons, including input, output, and hidden layers. See FIGS. 4A and 4B, for example. The input layer receives the text-based input(s) and the output layer generates the text-based response(s). The hidden layers in between process the input data and generate intermediate representations of the input that are used to generate the output. These hidden layers can include various types of neurons, such as convolutional neurons, recurrent neurons, and/or transformer neurons.

The training process begins with providing textual inquiries, an Internet corpus, a product information corpus, and a document corpus, whether labeled or unlabeled, at 510 to enable the AI/ML model to attempt to find answers to the inquiries from the Internet corpus, product information corpus, and/or document corpus. The AI/ML model is then trained over multiple epochs at 520 and results are reviewed at 530. While various types of AI/ML models may be used, LLMs are typically trained using a process called "supervised learning", which is also discussed above. Supervised learning involves providing the LLM with a large dataset of text-based inputs and their corresponding outputs, which the LLM uses to learn the relationships between the inputs and outputs. During the training process, the LLM adjusts the weights and biases of the neurons in the neural network to minimize the difference between the predicted outputs and the actual outputs in the training dataset.

One key aspect of LLMs in some embodiments is the use of transfer learning. In transfer learning, a pretrained LLM, such as GPT-3, is fine-tuned on a specific task or domain in step 520. This allows the LLM to leverage the knowledge already learned from the pretraining phase and adapt it to a specific application via the training phase of step 520.

The pretraining phase involves training an LLM on a large corpus of text, typically consisting of billions of words. During this phase, the LLM learns the relationships between words and phrases, which enables it to generate coherent and human-like responses to text-based inputs. The output of this pretraining phase is a LLM that has a high level of understanding of the underlying patterns in natural language.

In the fine-tuning phase (e.g., performed during step 520 in addition to or in lieu of the initial training phase of the LLM in some embodiments if a pretrained LLM is used as the initial basis for the model), the pretrained LLM is adapted to a specific task or domain by training the LLM on a smaller dataset that is specific to the task. For instance, in some embodiments, the LLM may be trained to provide nutrition information, allergy information, comparisons to other products, alert a user to potential interactions of ingredients with certain medications, etc. Such information may be provided as part of the training data, and the LLM may learn to focus on these areas and more accurately answer user inquiries pertaining thereto. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with relatively little training data.

If the AI/ML model fails to meet a desired confidence threshold at 540, the training data is supplemented and/or the reward function is modified to help the AI/ML model achieve its objectives better at 550 and the process returns to step 520. If the AI/ML model meets the confidence threshold at 540, the AI/ML model is tested on evaluation data at 560 to ensure that the AI/ML model generalizes well and that the AI/ML model is not over fit with respect to the training data. The evaluation data includes information that the AI/ML model has not processed before. If the confidence threshold is met at 570 for the evaluation data, the AI/ML model is deployed at 580. If not, the process returns to step 550 and the AI/ML model is trained further.

Figure 6:
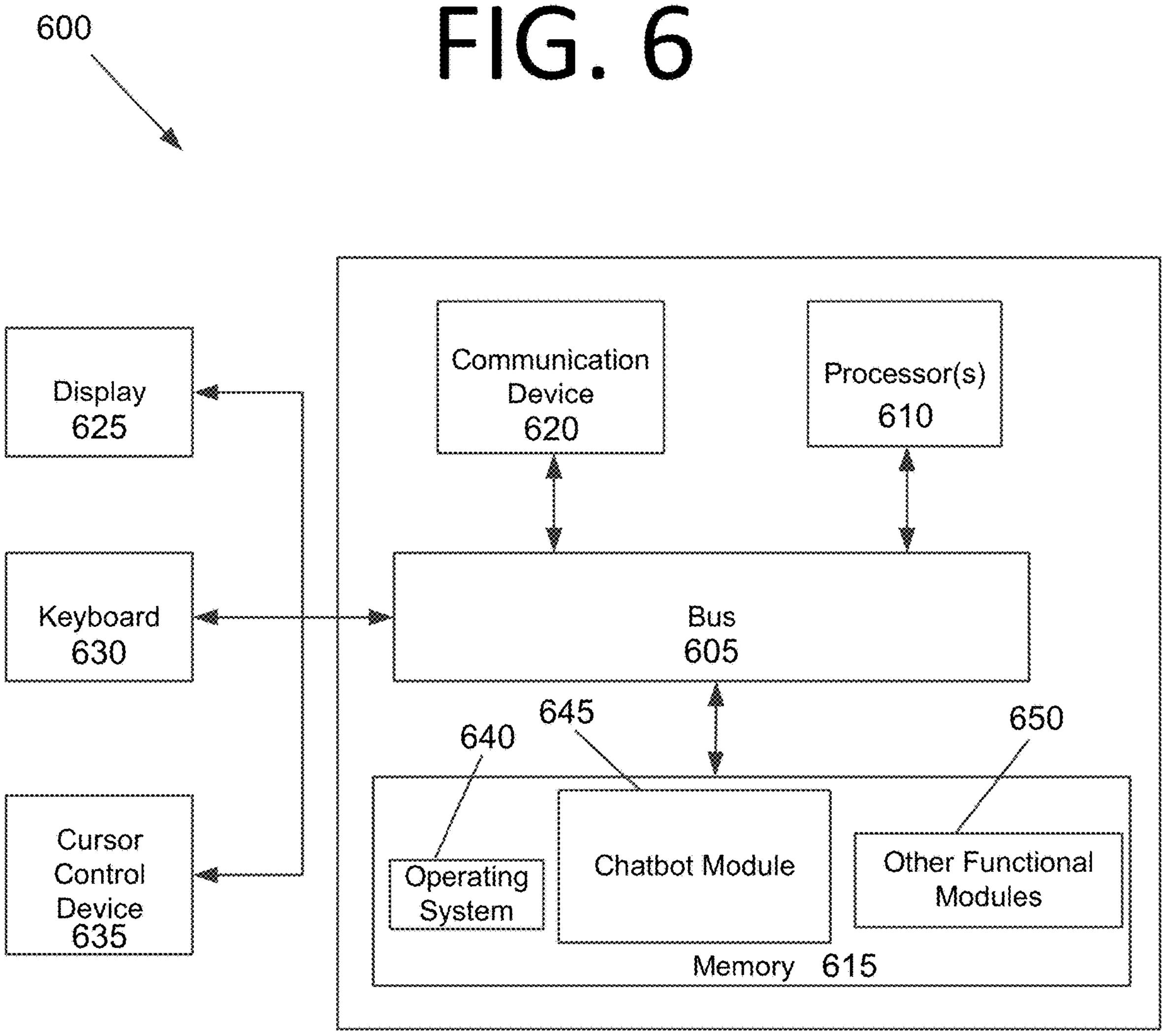
FIG. 6 is an architectural diagram illustrating a computing system configured to provide chatbot functionality or aspects thereof, according to an embodiment of the present invention.

FIG. 6 is an architectural diagram illustrating a computing system 600 configured to provide chatbot functionality or aspects thereof, according to an embodiment of the present invention. In some embodiments, computing system 600 may be one or more of the computing systems depicted and/or described herein, such as those of FIG. 1. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 620 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beamsteering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system 600. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 615 stores software modules that provide functionality when executed by processor(s) 610. The modules include an operating system 640 for computing system 600. The modules further include a chatbot module 645 that is configured to perform all or part of the processes described herein or derivatives thereof. Computing system 600 may include one or more additional functional modules 650 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 7:
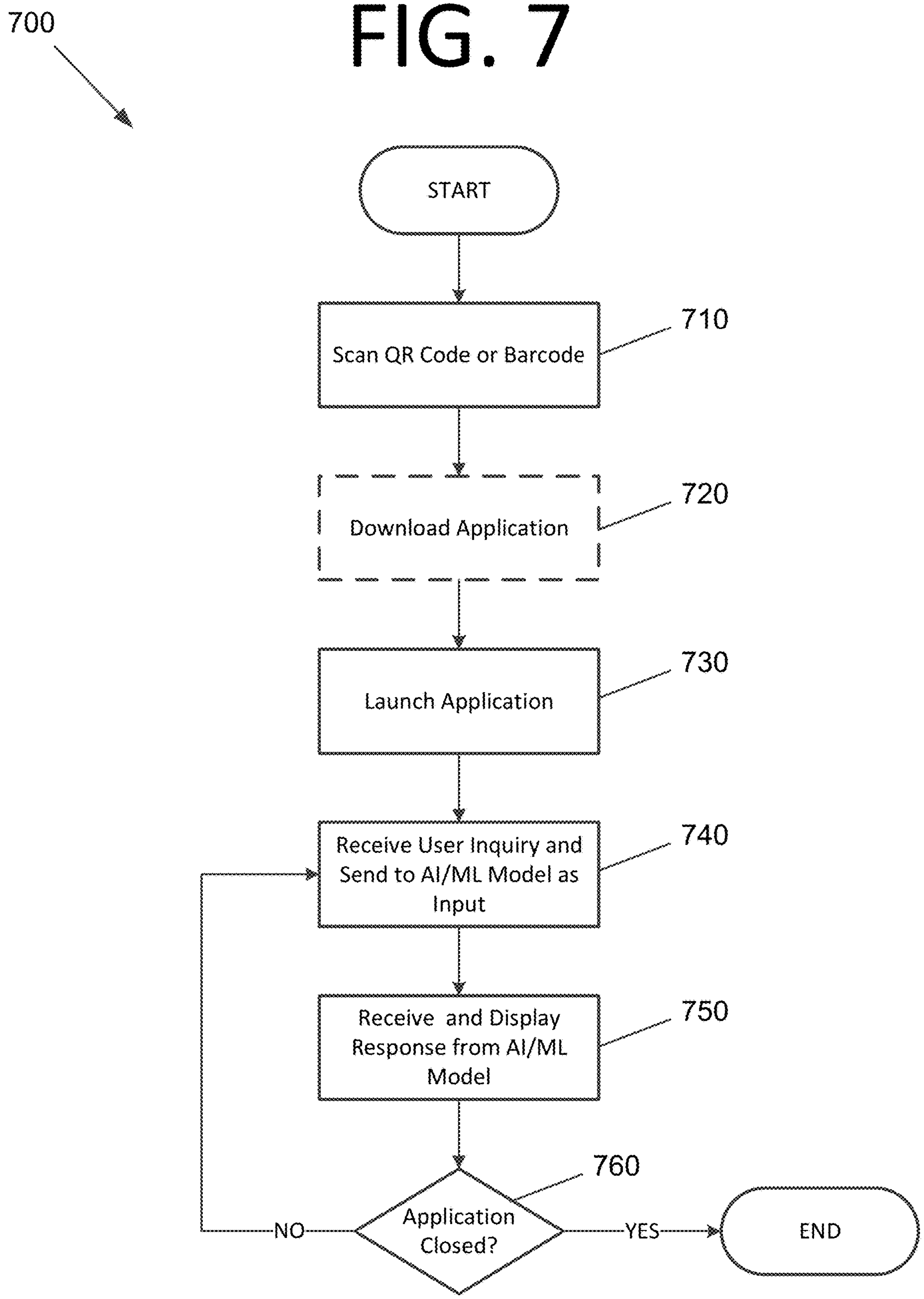
FIG. 7 is a flowchart illustrating a process for training and providing chatbot functionality, according to an embodiment of the present invention.

FIG. 7 is a flowchart illustrating a process 700 for training and providing chatbot functionality, according to an embodiment of the present invention. The process begins with a user scanning a QR code or a barcode of an electromechanical display device at 710 via a mobile computing system. In some embodiments, if an application associated with the QR code or a barcode is not present on the mobile computing system, the mobile computing system automatically downloads the application or opens an application store and downloads the application at the user's request at 720. The application associated with QR code or barcode is then launched at 730.

The application receives an inquiry pertaining to the product or service associated with the electromechanical display device and sends the inquiry to an AI/ML model (e.g., an LLM) as input at 740. The AI/ML model processes the inquiry and provides a response that is displayed by the application on the mobile computing system at 750. If the user closes the application at 760, the process ends. Otherwise, the process returns to step 740 for the next inquiry.

The process steps performed in FIG. 7 may be performed by computer program(s), encoding instructions for the processor(s) to perform at least part of the process(es) described in FIG. 7, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 610 of computing system 600 of FIG. 6) to implement all or part of the process steps described in FIG. 7, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An electromechanical display device, comprising:
a mounting mechanism;
an adjustable arm operably connected to the mounting mechanism; and
a display portion operably connected to the adjustable arm, the display portion comprising:
a plurality of rotating prisms, each rotating prism comprising a plurality of faces,
a motor configured to cause the plurality of rotating prisms to rotate,
a motion sensor configured to detect motion proximate to the electromechanical display device, and
a microprocessor operably connected to the motor and the motion sensor, wherein
responsive to the motion sensor detecting motion proximate to the electromechanical display device, the microcontroller is configured to cause the electromechanical display device to periodically rotate the plurality of rotating prisms.

2. The electromechanical display device of claim 1, wherein the adjustable arm is configured to raise and lower the display portion.

3. The electromechanical display device of claim 1, further comprising:
a speaker, lights, or both, operably connected to the microprocessor, wherein
the microprocessor is configured to cause the speaker to emit sound and/or the lights to glow or blink responsive to the motion sensor detecting the motion proximate to the electromechanical display device.

4. The electromechanical display device of claim 1, further comprising:
a housing that houses components of the display portion; and
a frame removably connected to the housing such that the plurality of rotating prisms are accessible when the frame is removed.

5. The electromechanical display device of claim 4, wherein
the frame is a sandwich frame comprising a screen, a screen frame, and a structural frame, and
the plurality of rotating prisms are visible through the screen.

6. The electromechanical display device of claim 1, wherein the plurality of rotating prisms comprise a digital display on at least one face.

7. The electromechanical display device of claim 1, further comprising:
a panel comprising a quick response (QR) code or a barcode, the QR code or barcode uniquely identifying a product or a service associated with messaging of the plurality of rotating prisms.

8. The electromechanical display device of claim 1, further comprising:
a clutch operably connected to a rotating prism of the plurality of rotating prisms; and
a printed circuit board (PCB) comprising a switch configured to be pressed by the clutch, wherein
the microprocessor is configured to detect that the switch was pressed by the clutch, via the PCB, and to stop rotation of the plurality of rotating prisms when the pressing of the switch is detected.

9. The electromechanical display device of claim 8, wherein the clutch comprises a plurality of teeth with a tooth for each corresponding set of faces of the plurality of rotating prisms, the teeth have a different size or shape, and the microprocessor is configured to detect which set of faces of the plurality of rotating prisms is currently visible based on how much the switch moves when pressed by a respective tooth of the clutch.

10. The electromechanical display device of claim 8, wherein the clutch comprises a plurality of teeth with a tooth for each corresponding set of faces of the plurality of rotating prisms, and the microprocessor is configured to track which set of faces of the plurality of rotating prisms is currently visible using a counter that the microprocessor increments when the microprocessor detects that the switch was pressed by a respective tooth of the clutch.

11. The electromechanical device of claim 10, wherein the microprocessor is configured to reset the counter after all sets of faces of the plurality of rotating prisms have been shown.

12. The electromechanical display device of claim 1, further comprising:

a drive gear operably connected to the motor via a drive shaft; and a plurality of spur gears, wherein a spur gear of the plurality of spur gears is operably connected to each prism of the plurality of prisms, and the plurality of spur gears are rotatably connected to the drive gear such that rotation of the drive gear by the motor causes the plurality of rotating prisms to rotate.

13. The electromechanical display device of claim 1, wherein the microprocessor is configured to operate the electromechanical display device in a passive mode by default that has lower power consumption than an active mode where the plurality of rotating prisms are rotated, the microprocessor is configured to transition the electromechanical display device to the active mode responsive to the motion sensor detecting the motion proximate to the electromechanical display device, and the microprocessor is configured to return the electromechanical display device to the passive mode after the motion sensor does not detect motion for a period of time.

14. An electromechanical display device, comprising:

a mounting mechanism;

an adjustable arm operably connected to the mounting mechanism, wherein the adjustable arm is configured to raise and lower a display portion of the electromechanical display device;

a plurality of rotating prisms, each rotating prism comprising a plurality of faces;

a motor configured to cause the plurality of rotating prisms to rotate;

a motion sensor configured to detect motion proximate to the electromechanical display device;

a microprocessor operably connected to the motor and the motion sensor;

a clutch operably connected to a rotating prism of the plurality of rotating prisms; and a printed circuit board (PCB) comprising a switch configured to be pressed by the clutch, wherein responsive to the motion sensor detecting motion proximate to the electromechanical display device, the microcontroller is configured to cause the electromechanical display device to periodically rotate the plurality of rotating prisms, and the microprocessor is configured to detect that the switch was pressed by the clutch, via the PCB, and to stop rotation of the plurality of rotating prisms when the pressing of the switch is detected.

15. The electromechanical display device of claim 14, further comprising:

a housing that houses components of the display portion; and a frame removably connected to the housing such that the plurality of rotating prisms are accessible when the frame is removed.

16. The electromechanical display device of claim 14, further comprising:

a panel comprising a quick response (QR) code or a barcode, the QR code or barcode uniquely identifying a product or a service associated with messaging of the plurality of rotating prisms.

17. The electromechanical display device of claim 14, further comprising:

a drive gear operably connected to the motor via a drive shaft; and a plurality of spur gears, wherein a spur gear of the plurality of spur gears is operably connected to each prism of the plurality of prisms, and the plurality of spur gears are rotatably connected to the drive gear such that rotation of the drive gear by the motor causes the plurality of rotating prisms to rotate.

18. The electromechanical display device of claim 14, wherein the microprocessor is configured to operate the electromechanical display device in a passive mode by default that has lower power consumption than an active mode where the rotating display is rotated, the microprocessor is configured to transition the electromechanical display device to the active mode responsive to the motion sensor detecting motion proximate to the electromechanical display device, and the microprocessor is configured to return the electromechanical display device to the passive mode after the motion sensor does not detect motion for a period of time.

19. An electromechanical display device, comprising:

a mounting mechanism;

an adjustable arm operably connected to the mounting mechanism, wherein the adjustable arm is configured to raise and lower a display portion of the electromechanical display device;

a plurality of rotating prisms, each rotating prism comprising a plurality of faces;

a motor configured to cause the plurality of rotating prisms to rotate;

a motion sensor configured to detect motion proximate to the electromechanical display device; and a microprocessor operably connected to the motor and the motion sensor, wherein the microprocessor is configured to operate the electromechanical display device in a passive mode by default that has lower power consumption than an active mode where the plurality of rotating prisms are rotated, the microprocessor is configured to transition the electromechanical display device to the active mode responsive to the motion sensor detecting the motion proximate to the electromechanical display device, and the microprocessor is configured to return the electromechanical display device to the passive mode after the motion sensor does not detect motion for a period of time.

* * * * *